(12) United States Patent
Reid et al.

(10) Patent No.: US 6,267,492 B1
(45) Date of Patent: Jul. 31, 2001

(54) ILLUMINATION DEVICE WITH SIDE EMITTING LIGHT GUIDE

(75) Inventors: Thomas J. Reid, White Bear Lake; David J. Lundin, Woodbury, both of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/293,562

(22) Filed: Apr. 15, 1999

(51) Int. Cl.[7] ............................. F21V 7/04; G02B 6/00; G09F 13/00
(52) U.S. Cl. .................... 362/551; 362/560; 362/577; 362/581; 362/287; 385/901
(58) Field of Search ....................... 362/551, 560, 362/577, 581, 269, 232, 287; 385/901

(56) References Cited

U.S. PATENT DOCUMENTS

| | | | |
|---|---|---|---|
| 3,582,638 | * | 6/1971 | Peters ................................. 240/6.46 |
| 4,765,701 | | 8/1988 | Cheslak . |
| 4,822,123 | | 4/1989 | Mori . |
| 5,219,217 | * | 6/1993 | Aikens ................................. 362/32 |
| 5,222,795 | | 6/1993 | Hed . |
| 5,432,876 | | 7/1995 | Appeldorn et al. . |
| 5,450,293 | | 9/1995 | Hoffman . |
| 5,602,948 | | 2/1997 | Currie . |
| 5,631,994 | | 5/1997 | Appeldorn et al. . |
| 5,659,643 | | 8/1997 | Appeldorn et al. . |
| 5,746,495 | | 5/1998 | Klamm . |
| 5,790,725 | * | 8/1998 | Rykowoski et al. ................... 385/33 |
| 5,845,038 | | 12/1998 | Lundin et al. . |
| 5,857,758 | | 1/1999 | Dealey, Jr. et al. . |

* cited by examiner

*Primary Examiner*—Sandra O'Shea
*Assistant Examiner*—Ali Alavi
(74) *Attorney, Agent, or Firm*—Scott R. Pribnow (57) ABSTRACT

Side emitting light guides are provided in connection with illumination devices, light guide systems, and tasklight illumination kits. The side emitting light guides may be provide bright directional light, or they may be provide diffuse light. The side emitting light guides may be flexible to allow for insertion into tortuous passageways. The light guides may also have a relatively small profile and/or a solid core. The light guides may also include shades that allow an operator to convert the light guides from side emitting to end emitting in order to provide brighter, more focused illumination in a particular area to perform some tasks. When completed, the user has the option of re-configuring the light guides for side emission to provide general area illumination.

34 Claims, 5 Drawing Sheets

ILLUMINATION DEVICE WITH SIDE EMITTING LIGHT GUIDE

FIELD OF THE INVENTION

The present invention relates to side emitting light guides useful in connection with illumination devices.

BACKGROUND OF THE INVENTION

Illumination devices such as tasklights or worklights are used in many different situations where illumination of an area is required to allow an individual to perform a task, e.g., repair or install a component, or for other purposes. These devices typically use incandescent or fluorescent light sources, both of which suffer from a variety of problems. For example, incandescent lights are easily broken, generate considerable heat that can burn skin, upholstery, etc., and may be a fire hazard around fuels such as gasoline. Incandescent lights may also pose a shock hazard around water or when used in wet areas.

Fluorescent lights tend to be cooler than incandescent lights, but remain fragile and are typically too large to insert or place in areas with limited clearance. Furthermore, fluorescent lights typically do not offer the ability to provide focused, or at least collimated, light energy to allow for more detailed visual inspection.

In some situations where incandescent or fluorescent worklights are not practicable, flashlights may be used to provide the desired illumination. However, flashlights are often too large to be placed in positions where they can illuminate the desired areas. If the flashlights are small enough to be placed in the proper positions, they often cannot provide enough light energy to provide the desired illumination.

Attempts to use optical light fibers or other light guides as worklights or task lights have focused on the use of end-emitting fibers to provide spot illumination of relatively small areas. Where general area illumination is required, a different worklight is used or the light guide is removed from the light source and the light source alone is used to provide the desired general illumination.

SUMMARY OF THE INVENTION

The present invention exploits the properties of side emitting light guides to provide illumination devices, light guide systems, and tasklight illumination kits that provide unique advantages. Among the advantages of the invention are the ability to use a remote light source located at one end of the light guide. Where the light guide is long enough, the light source may be located outside of a hazardous area to reduce electrical or fire hazards associated with the light source.

The side emitting light guides may be provided in a form that provides bright directional light, or they may be provided in forms that provide diffuse light. In either case, the light emitted from the light guides is preferably bright enough to provide sufficient illumination for a variety of tasks.

The light guides of the present invention are preferably flexible to allow for insertion into tortuous passageways. The light guides may also have a relatively small profile, allowing the light guide to be inserted through small orifices to provide desired illumination within, for example, an automobile door, an engine compartment, engine port, the housing of a piece of equipment, etc.

The light guides are also preferably provided with solid cores to improve durability. A solid core light guide may, for example, resist failure under compression when, for example, the light guide is stepped on, run over by a vehicle, etc.

Light guides that provide the desired flexibility and durability are preferably manufactured of polymeric compositions that are substantially optically transparent and/or are capable of transmitting light of the desired wavelength or wavelengths.

Furthermore, the light guides may include components that allow an operator the ability to convert the light guides from side emitting to end emitting in order to provide brighter, more focused illumination in a particular area to perform some tasks. When completed, the user has the option of re-configuring the light guide for side emission to provide general area illumination.

In kit form, the side emitting light guides of the present invention can be provided with various lateral angular distribution characteristics to provide illumination over desired areas. For example, a narrower lateral angular distribution of light from a side emitting light guide may provide brighter light in a smaller area for the performance of critical tasks. Conversely, a broader lateral angular distribution of light from a side emitting light guide may be useful for more general area lighting where higher illumination levels are not required. In some situations it may be desired to provide a side emitting light guide that emits light in a full 360 degree arc around the light guide.

In one aspect, the present invention provides an illumination device including a light source and a light guide extending along a longitudinal axis. The light guide includes an input end adapted for connection to the light source and a light emitting region directing light traveling through the light guide from the light source out of at least a portion of at least one surface of the light guide in a direction generally transverse to the longitudinal axis of the light guide. The light source and the light guide are rotatably connected such that the light emitting region of the light guide can be rotated relative to the light source about the longitudinal axis.

In one aspect, the present invention provides a tasklight including a light source and a light guide extending along a longitudinal axis. The light guide includes an input end adapted for connection to the light source and a light emitting region directing light traveling through the light guide from the light source out of at least a portion of at least one surface of the light guide in a direction generally transverse to the longitudinal axis of the light guide. The light source and the light guide are rotatably connected such that the light emitting region of the light guide can be rotated relative to the light source about the longitudinal axis.

In one aspect, the present invention provides a worklight including a light source and a light guide extending along a longitudinal axis. The light guide includes an input end adapted for connection to the light source and a light emitting region directing light traveling through the light guide from the light source out of at least a portion of at least one surface of the light guide in a direction generally transverse to the longitudinal axis of the light guide. The light source and the light guide are rotatably connected such that the light emitting region of the light guide can be rotated relative to the light source about the longitudinal axis.

In another aspect, the present invention provides a light guide system including a core extending along a longitudinal axis. The core includes an input end adapted for connection to a light source; and a light emitting region directing light traveling through the core out of at least a portion of at least one surface of the core in a direction generally transverse to the longitudinal axis. The light guide system also includes a shade moveable between a closed position, where the shade is located over substantially all of the light emitting region, and an open position, where the shade is removed from substantially all of the light emitting region.

In another aspect, the present invention provides an illumination kit for an illumination device including a first light guide having a core extending along a longitudinal axis. The first light guide includes an input end adapted for connection to a light source and a light emitting region directing light traveling through the light guide from the light source out of at least a portion of at least one surface of the light guide in a direction generally transverse to the longitudinal axis. The light emitted from the first light guide has a first lateral angular distribution. The kit also includes a second light guide including a core extending along a longitudinal axis and an input end adapted for connection to a light source. The second light guide also includes a light emitting region directing light traveling through the light guide from the light source out of at least a portion of at least one surface of the light guide in a direction generally transverse to the longitudinal axis of the light guide. The light emitted from the second light guide has a second lateral angular distribution.

Glossary

The term "illumination device" refers to devices that provide light with desired wavelengths, intensities and distribution properties. Illumination devices include tasklights and worklights. Illumination devices may be portable or stationary.

The term "lateral angular distribution" refers to the angle over which light is emitted from the light guide as measured in a plane that is generally perpendicular to the longitudinal axis of the light guide.

The term "light emitting region" refers to the portions of a light guide from which light propagating through the light guide is emitted. The light emitting region may extend along the entire length of the light guide or it may extend along only a portion of the length of the light guide. The light emitting region may emit light with a lateral angular distribution of 360 degrees or less.

The term "light extraction mechanism" refers to mechanisms designed to extract light propagating through the light guide. Examples of extraction mechanisms include elements on the surface of the light guide, treatments to the surface of the light guide (e.g., abrasion, etc.), and/or one or more materials on the surface light guide that reflect or otherwise extract light out of the light guide.

The term "light guide" refers to an article that receives light at an input end and propagates the light to an output end or an extraction mechanism without significant losses. In general, light guides operate on the principle of total internal reflection, whereby light travelling through the light guide is reflected at the surfaces of the light guide based on differences in the indices of refraction of the material of the light guide and the material immediately surrounding the light guide, e.g., air, cladding, etc.

The term "substantially optically transparent" means that the element referred to absorbs none or only minor amounts of light of the desired wavelengths passing through the element.

The term "tasklight" refers to devices designed to illuminate an area or areas during performance of a task or tasks. The tasks may be performed by a person or animal or they may be performed by machines (e.g., inspection via cameras or other sensors). Tasklights may be portable or stationary.

The term "worklight" refers to devices designed to illuminate areas during the performance of a task or tasks by a person. Worklights may be portable or stationary.

These and other features and advantages of the present invention will be described more completely below with respect to various illustrative embodiments of the invention.

DETAILED DESCRIPTION OF ILLUSTRATIVE EMBODIMENTS OF THE INVENTION

Figure 1:
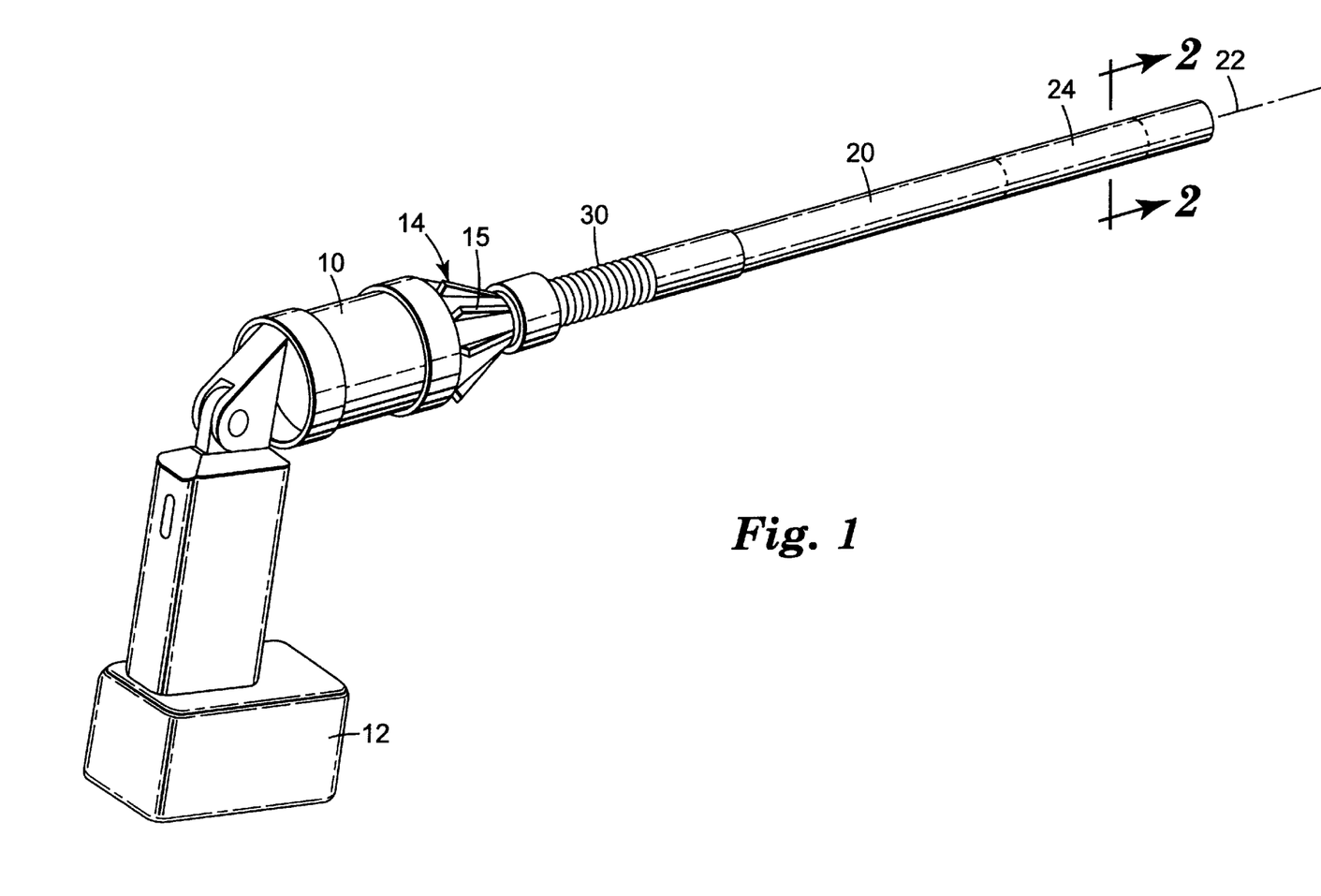
FIG. 1 is a perspective view of one illumination device according to the present invention.

FIG. 1 is a perspective view of one illumination device according to the present invention including a light source 10 optically coupled to a light guide 20. The light guide 20 is elongated along a longitudinal axis 22. Also illustrated in FIG. 1 is an optional sleeve 30, which will be described in more detail below.

The illumination device illustrated in FIG. 1 may be used to provide illumination for any desired purpose. It may be preferred that the illumination device be a tasklight, i.e., a light used to illuminate an area or areas during performance of a task or tasks. The tasks may be performed by a person or animal or they may be performed by machines (e.g., inspection via cameras or other sensors). In an alternative configuration, the illumination device may be a worklight, i.e., a light used to illuminate areas during the performance of a task or tasks by a person. Further, the illumination devices according to the present invention may be portable or stationary.

The light source 10 may provide light by any suitable mechanism. For example, light source 10 may be incandescent, fluorescent, an array of light emitting diodes, high intensity discharge (HID) lamp, or any other suitable source producing light having the desired wavelength or range of wavelengths. Typically, the preferred light source will emit light energy in the visible wavelength spectrum or at least a portion of the visible wavelength spectrum. Although the light source 10 illustrated in FIG. 1 is powered by a battery 12, it will be understood that the energy used to power the light source 10 could alternatively be alternating current, direct current, etc.

Where the light source 10 is larger than the cross-sectional diameter of the light guide 20, it may also be desirable to include a coupling 14 to transition from the larger cross-sectional size of the light source 10 down to the smaller cross-sectional size of the light guide 20.

The coupling 14 may preferably be lined with a highly reflective material, such as a metal coating, to efficiently deliver light to the light guide 20. One alternative to a metal coating for the interior of the coupling 14 is a reflective material such as the reflective multi-layer optical films described in, for example, PCT Publication Nos. WO95/17303; WO95/17691; WO95/17692; WO95/17699; and WO96/19347. Examples of reflective multi-layer optical films such as those described in the above-listed PCT Publications are available from Minnesota Mining & Manufacturing Company, St. Paul, Minn. Such reflective films may be particularly desirable for their abilities to reflect light energy well into the infrared spectrum to reduce heat build-up in the coupling 14.

The light source 10 may include a fan or other cooling device to remove thermal energy generated by the light source during operation. In addition, the coupling 14 may include cooling fins 15 to dissipate thermal energy from the coupling 14.

It is preferred that the light guide 20 be attached to the light source 10 in a manner that allows for rotation of the light guide 20 about its longitudinal axis 22. The rotation of light guide 20 about longitudinal axis also preferably rotates the light emitting region 24. One advantage provided by rotation of the light guide 20 about longitudinal axis 22 relative to the light source 10 is that the direction of the light exiting from the light emitting region 24 can be varied to provide illumination in a desired direction depending on the needs of the user.

Where a coupling 14 is used to connect the light source 10 and light guide 20, the coupling 14 may be fixed to the light guide 20, in which case the light guide 20 and coupling 14 both rotate relative to the light source 10. Alternatively, the coupling 14 may be fixed to the light source 10, in which case the light guide 20 rotates relative to the coupling 14 and the light source 10. Regardless of the actual construction, however, the end result is that the light guide 20 rotates about its longitudinal axis relative to the light source 10.

The light guide 20 is a side emitting light guide in which light propagating along the length of the light guide 20 is extracted from a side surface thereof. Side emitting light guides, such as light guide 20 illustrated in FIG. 1, preferably include a light emitting region 24 from which light extracted from the light guide is emitted. The emitted light is preferably directed generally transverse to the longitudinal axis 22 of the light guide 20.

Figure 2:
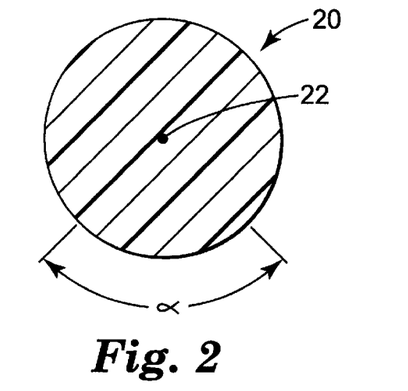
FIG. 2 is an enlarged cross-sectional view of the light guide of the illumination device of FIG. 1 taken along line 2—2 in FIG. 1.

FIG. 2 is a cross-sectional view of the light guide 20 taken along line 2—2 in FIG. 1 in the light emitting region 24. In one aspect of the present invention the light guide 20 is preferably rotatable such that the light emitting region 24 of the light guide 20 can be rotated relative to the light source 10 about the longitudinal axis 22.

Also illustrated in FIG. 2 is the lateral angular distribution over which the light emitted from the light guide 20 is distributed. That lateral angular distribution is represented by angle a in FIG. 2 and, for light guides that are rotatable relative to the light source, the angle α is less than 360 degrees. It may be even more preferred that the lateral angular distribution α of light exiting from the light emitting region 24 of the light guide 20 is about 300 degrees or less, and even more preferred, about 180 degrees or less.

Figure 3A:
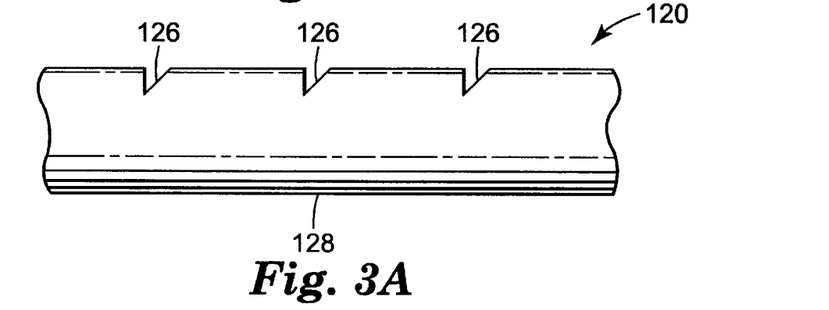
FIGS. 3A–3C depict examples of extraction mechanisms that may be used to provide side emission from light guides used in connection with the present invention.

The lateral angular distribution of light energy emerging from the light guide 20 can be controlled by a variety of methods. One technique for controlling lateral angular distribution of light energy from a light guide is illustrated in FIG. 3A, where reflective optical elements 126 are provided on the light guide 120. The reflective optical elements 126 reflect light across the light guide 120 (i.e., generally transverse to the longitudinal axis 122). The reflected light exits through a side surface 128 of the light guide 120 that is opposite from the elements 126. This type of light extraction mechanism is a back extracting mechanism. Examples of some suitable reflective optical elements are described in, e.g., U.S. Pat. Nos. 5,432,876 (Appeldorn et al.); 5,659,643 (Appeldorn et al.) and 5,845,038 (Lundin et al.).

Figure 3B:
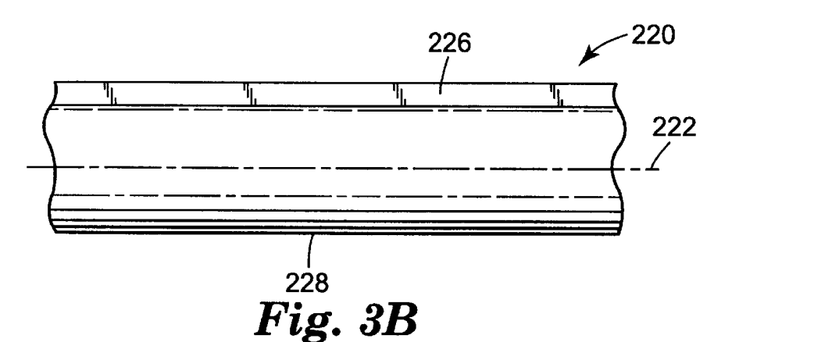

FIG. 3B illustrates another extraction mechanism on light guide 220 in the form of an extraction strip 226. The extraction strip 226 preferably disrupts propagation of light along the light guide 220 and causes a substantial portion of the light to be emitted out of the light guide 220 in a direction generally transverse to the longitudinal axis 222. Depending on the exact composition and properties of the material or materials used in the extraction strip 226, the emitted light may pass through the extraction strip 226 as it exits the light guide 220. In such a configuration, the extraction strip 226 is an example of a front extracting extraction mechanism.

Alternatively, the composition and properties of the material or materials used in the extraction strip 226 may cause a substantial portion of the emitted light to reflect from the extraction strip 226, thereby directing the light across the light guide 220 to exit from the opposite side 228 of the light guide 220. In such a configuration, the extraction strip 226 is an example of a back extracting extraction mechanism.

In yet another alternative, the extraction strip 226 may exhibit a combination of both front and back extraction of light propagating along the length of the light guide 220. In other words, the extraction strip 226 may transmit some light and reflect other light to the opposite side 228 of the light guide 220.

The extraction strip 226 may be provided in a variety of configurations. Examples of suitable extraction strips may include paint, tape, coatings, films, etc. that are applied to the surface of the light guide. Where the extraction is to involve reflection, the extraction strip 226 preferably includes materials that are reflective to light of the desired wavelength or wavelengths.

Figure 3C:
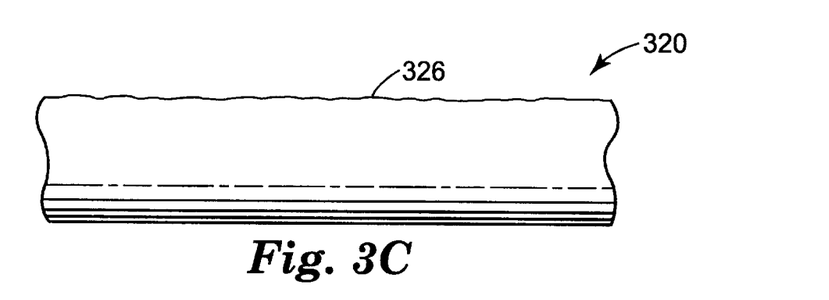

FIG. 3C illustrates another extraction mechanism in the form of an optically rough surface 326 on the light guide 320 which also disrupts total internal reflection of light propagating through the light guide 320. The optically rough surface may be provided through abrasion or other deformation, etc. One example of an extraction mechanism in the form of an optically rough surface is described in U.S. patent application Ser. No. 08/957,554 (filed Oct. 24, 1997), titled OPTICAL WAVEGUIDE WITH DIFFUSE LIGHT EXTRACTION (Attorney Docket No. 53435USA1A). As described there, the optically rough surface may be located between the core of the light guide 320 and its cladding. Alternatively, light guides in accordance with the present invention may also rely on an exposed optically rough surface where air or any other medium in which the light guide 320 is located provides the desired refractive index differential necessary to achieve total internal reflection along smooth portions of the light guide 320.

Those skilled in the art will recognize that a wide variety of extraction mechanisms other than those specifically described herein can provide for side emission of light from a light guide. Furthermore, it will also be understood that the extraction mechanisms may be modified to provide for uniform extraction along the length of the light emitting region of the light guide. Such modifications may include, for example, variations in the spacing between reflective optical elements along the length of the light guide, pattern coating of a coated extraction mechanism, varying the roughness of an optically rough surface along the length of the light guide, etc.

Returning to FIGS. 1 and 2, the light guide 20 can have a variety of constructions, although it is preferred that the light guide 20 be provided in the form of a solid core of substantially optically transparent material or materials. By substantially optically transparent, it is meant that the materials transmit substantial portions of light with the desired wavelength or wavelengths.

Materials and methods of manufacturing some exemplary light guides are described in U.S. Pat. No. 5,432,876 (Appeldorn et al.), U.S. Pat. No. 5,845,038 (Lundin et al.), and U.S. patent application Ser. No. 09/026,836 (filed Feb. 20, 1998), titled METHOD AND APPARATUS FOR SEAMLESS MICROREPLICATION USING AN EXPANDABLE MOLD.

Although the light guides can be manufactured from any suitable substantially optically transparent material or materials, it may be desirable that the light guides be manufactured of polymeric materials, preferably curable polymeric materials, e.g., acrylates, when the light guides are to be manufactured by molding. Where more flexibility is desired, materials such as urethanes and/or silicones may be used. Examples of some useful curable polymeric materials for light guides according to the present invention include polyurethanes that are the polymerization reaction product of one or more polyisocyanates with one or more polyols. Polyurethanes useful in the light guides may preferably be thermoplastics or thermosets that are also substantially optically transparent.

In addition to optical transparency, it may also be preferred that the light guides of the present invention exhibit flexibility, i.e., the ability to be bent along the longitudinal axis without significant negative impacts on the ability of the light guide to propagate light. Flexibility can allow for bending and/or shaping of the light guides as required during use.

Returning to FIG. 1, the light emitting region 24 of the light guide 20 may have a length along a longitudinal axis 22 that is less than the total length of the light guide 20 along the longitudinal axis 22. Alternatively, the light emitting region 24 may extend over the entire length of the light guide 20 along the longitudinal axis 22.

Figure 4A:
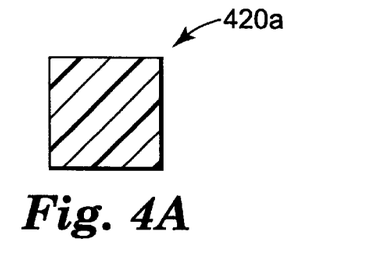
FIGS. 4A–4C illustrate various cross-sectional profiles of light guides useful in connection with the present invention.
Figure 4B:
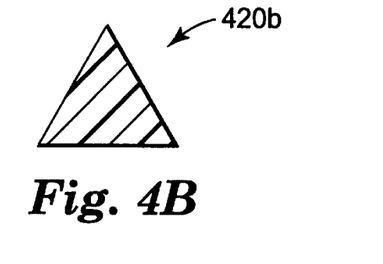
Figure 4C:
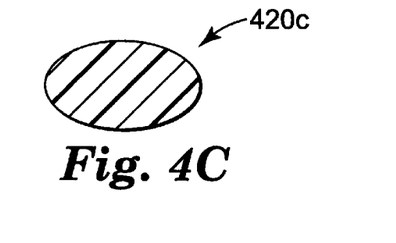

FIGS. 4A–4C illustrate a variety of different cross-sectional profiles for light guides that may be useful in connection with the present invention. For example, light guide 420a in FIG. 4A has a generally square cross-sectional profile, while light guide 420b in FIG. 4B has a triangular cross-sectional profile, and light guide 420c in FIG. 4C has a generally elliptical cross-sectional profile. The various cross-sectional profiles for light guides illustrated in FIGS. 2 and 4A–4C are meant to be exemplary only and are not meant to limit the present invention in any way. Those skilled in the art will understand that the light guides used in connection with the present invention can have cross-sectional profiles of any suitable shape, i.e., circular, square, rectangular, triangular, elliptical, polygonal, combinations of one or more of the above, etc.

Figure 5:
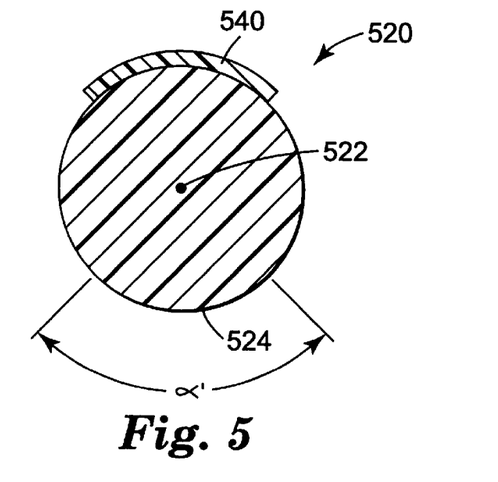
FIG. 5 is a cross-sectional view of one light guide according to the present invention.

FIG. 5 illustrates a cross-sectional view of another light guide 520 useful in connection with the present invention. The light guide 520 emits light from a surface thereof with a lateral angular distribution relative to the longitudinal axis 522 as illustrated by angle $\alpha'$ in FIG. 5. FIG. 5 also illustrates another feature of the light guides useful in connection with the present invention. That feature is a glare shield 540. The glare shield 540 preferably prevents or reduces emission of light out of a portion of the light guide even within the light emitting region of the light guide. The purpose of the glare shield is to prevent emitted light (which can cause glare if emitted directly towards a viewer) from obscuring or obstructing with the vision of a person working around the light guide 520. The glare shield 540 is preferably fixedly attached to the light guide 520 and is also preferably generally located opposite from the light emitting region 524 of the optical light guide (where the light emitting region 524 is defined by the lateral angular distribution of emitted light).

In various embodiments, the glare shield may comprise a separate structure located on the light guide and, in other embodiments, the extraction mechanism itself may provide the desired glare shield. For example, many back extracting extraction mechanisms such as reflective optical elements (see FIG. 3A) or extraction strips (see FIG. 3B) may serve as glare shields in addition to performing the function of extracting light from the light guides. Alternatively, the glare shield 540 may be applied over a back extracting extraction mechanism such as reflective optical elements to provide additional glare protection.

In addition to the use of extraction mechanisms in or on the core of a light guide used in connection with the present invention, the illumination systems may also include shades to control light distribution. The shades may be located over substantially all of the light emitting regions of the light guides in a closed position and removed from substantially all of the light emitting regions in an open position. The use of shades may allow further flexibility to an operator in controlling light distribution when using light guides according to the present invention.

The shades may be constructed of materials that are opaque to the light transmitted out of the light emitting regions of the light guide. Alternatively, the shades may be constructed out of light-attenuating materials, i.e., materials that limit or attenuate the transmission of light therethrough in some manner to, e.g., reduce its intensity. In still other variations, portions of the shades may be opaque, portions may be light-attenuating and portions may be substantially optically transparent.

The shades may be constructed of any suitable material such as plastics, fabrics, metals (e.g., a metal mesh), reflective materials, absorptive materials, etc. It may be desirable that the inner surfaces of the shades be reflective to potentially recycle light emitted from the light guides underneath the shades.

The shades may preferably be collapsible such that desired lengths of the light guides can be exposed by collapsing the shades along the length of the light guides. For example, the shades may be collapsible in an accordion-like manner.

The shades may also preferably be flexible, i.e., capable of being bent along the longitudinal axis of the light guide as it is also bent to conform to a curved shape. This flexibility may be achieved by using materials such as fabrics, films, etc. that are themselves flexible. Alternatively, the desired flexibility may be provided in a shade having a structure that provides the desired flexibility, e.g., in the manner of a series of annular rings such as in a gooseneck mechanism.

In one embodiment, the shade may be provided in the form of a sleeve or sleeves which may be located over the light guides used in connection with the present invention. The sleeves themselves may be fixedly attached to the light guides or they may be removably fitted over the light guides as desired by a user. The sleeves may be disposable after use and may also serve the function of protecting the surface of the light guide from debris such as overspray in a paint booth or other environment.

Figure 6A:
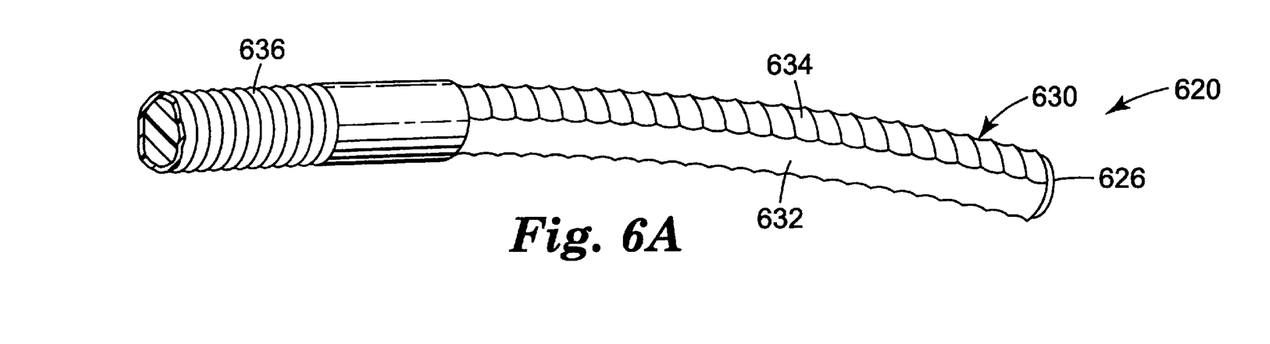
FIGS. 6A–6C illustrate a light guide including a shade in the form of a compressible sleeve.
Figure 6B:
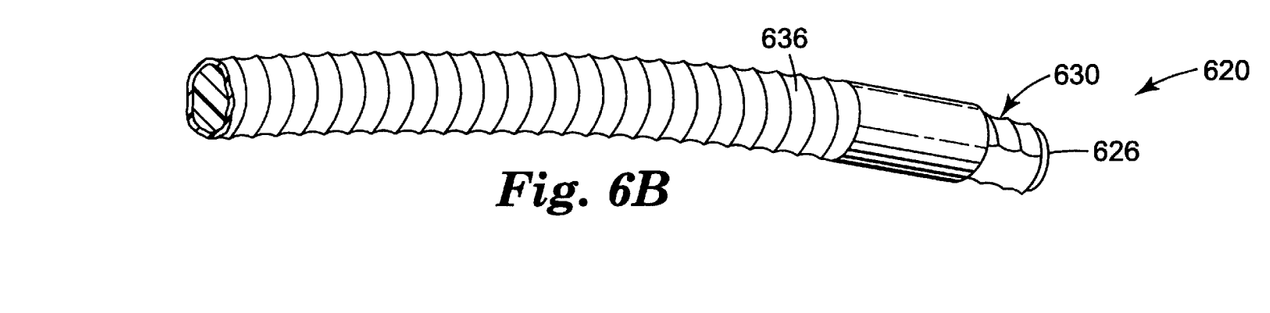
Figure 6C:
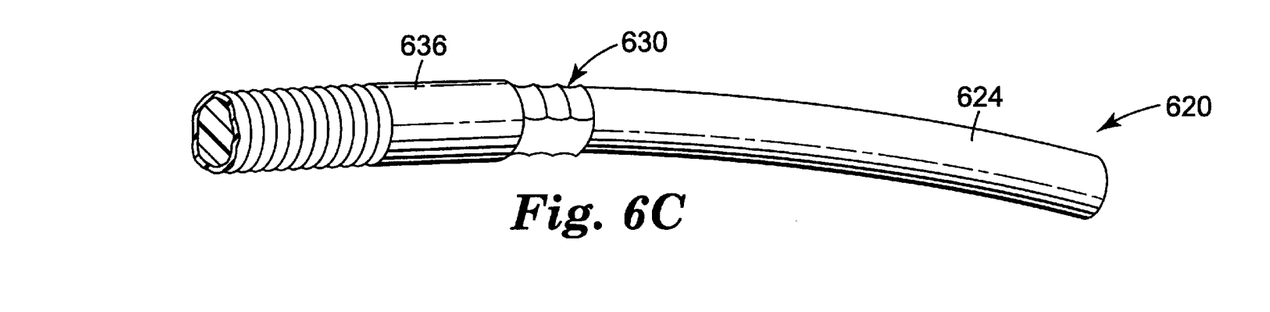

FIGS. 6A–6C illustrate one embodiment of a sleeve system useful in connection with the present invention. FIG. 6A illustrates an inner sleeve 630 extended over substantially the entire length of a light guide 620. The inner sleeve 630 includes a window 632 that is preferably substantially optically transparent to light emitted from a light emitting region 624 of the light guide 620. The window 632 may be provided out of optically transparent materials or, alternatively, may be provided as a void or voids in the sleeve 630.

The window 632 preferably extends along a length of the light guide 620 and also extends around at least a portion of the perimeter or circumference of the light guide 620. In some embodiments, the window 632 may extend along substantially the entire length of the light guide 620. In other embodiments, the window 632 may extend along only a portion of the entire length of the light guide 620.

Inner sleeve 630 also preferably includes a shade portion 634 which provides for limited or no transmission of light emitted from the light emitting region of the light guide 620. As such, the shade portion 634 of inner sleeve 630 may also function as a glare shield because it attenuates the emission of light through at least a portion of the side surface of the light guide 620. It may be preferred that the shade portion 634 of the inner sleeve be reflective to light emitted from the light guide 620. If the shade portion 634 reflects light emitted from the light guide 620, at least a portion of that reflected light may be directed towards the window 632 in the inner shade, thereby increasing the illumination provided by the light guide 620.

Also illustrated in FIGS. 6A and 6B is an outer sleeve 636. Substantially all of outer sleeve 636 is preferably either opaque to light emitted from the light guide 620 or at least provides for limited transmission of light. In FIG. 6B, the outer sleeve 636 is extended to cover substantially all of the inner sleeve 630 as well as substantially all of the light guide 620. In that configuration, only the end 626 of the light guide 620 is preferably exposed. In some embodiments the end 626 of the light guide 620 may emit light propagating along the length of the light guide 620. If the distal end 626 is emissive, then the light propagated along the light guide 620 will be emitted from the end 626 of the light guide 620. End-emission illumination may be useful where high levels of illumination in relatively small areas are desired.

Alternatively, the end 626 of the light guide 620 may include a reflective element, e.g., film, coating, etc. such that light reaching the end 626 of the light guide is reflected back along the longitudinal axis of the light guide 620, thereby preventing end-emission.

In FIG. 6A, the outer sleeve 636 has been pulled back or removed from at least a portion of the inner sleeve 630. As a result, the window 632 of the inner sleeve 630 is exposed. The result of the configuration illustrated in FIG. 6A is that light will be emitted through the window 632 of the inner sleeve 630 while the shade portion 634 of the inner sleeve 630 will block or reduce emission of light from at least a portion of the light guide 620. As discussed above, this shade portion 634 can also function as a glare shield.

FIG. 6C illustrates another configuration in which both inner sleeve 630 and outer sleeve 636 are withdrawn from at least a portion of the light guide 620 such that substantially all of the light emitting region 624 of the light guide 620 is exposed. In this embodiment, the light emitting region 624 preferably extends about the circumference of the light guide 620. Where directional control of the light is desired, the inner sleeve 630 can be extended over the light emitting portion 624, as illustrated in FIG. 6A, to provide directional control for side emitted light through the window 632 in inner sleeve 630. In the configuration illustrated in FIG. 6C, however, the light guide 620 is emitting light throughout its circumference to provide, e.g., general area illumination.

The patents, patent documents, and publications cited herein are incorporated by reference in their entireties as if each were individually incorporated by reference. Various modifications and alterations of this invention will become apparent to those skilled in the art without departing from the scope of this invention. Accordingly, it is to be understood that this invention is not to be limited to the illustrative embodiments set forth herein, but is to be controlled by the limitations set forth in the following claims and any equivalents thereof.

What is claimed is:

1. An illumination device comprising:
   a light source;
   a light guide extending along a longitudinal axis, the light guide comprising:
      a solid core;
      an input end adapted for connection to the light source; and
      a light emitting region directing light traveling though the light guide
      from the light source out of at least a portion of at least one surface of
      the light guide in a direction generally transverse to the longitudinal
      axis;
   wherein the light source and the light guide are rotatably connected such that the light emitting region of the light guide can be rotated relative to the light source about the longitudinal axis.

2. A task light comprising:
   a light source;
   a light guide extending along a longitudinal axis, the light guide comprising:
      a solid core;
      an input end adapted for connection to the light source; and
      a light emitting region directing light traveling though the light guide
      from the light source out of at least a portion of at least one surface of
      the light guide in a direction generally transverse to the longitudinal
      axis;
      wherein the light source and the light guide are rotatably connected such that the light emitting region of the light guide can be rotated relative to the light source about the longitudinal axis.

3. A device according to claim 1, wherein the light emitting region has a length along the longitudinal axis that is less than a total length of the light guide along the longitudinal axis.

4. A device according to claim 1, wherein the light emitting region of the light guide emits light with a lateral angular distribution of less than 360 degrees.

5. A device according to claim 1, wherein the light emitting region of the light guide emits light with a lateral angular distribution of about 180 degrees or less.

6. A device according to claim 1, wherein the light guide further comprises a glare shield.

7. A device according to claim 6, wherein the glare shield is fixedly attached to the light guide.

8. A device according to claim 1, wherein the light emitting region comprises an extraction mechanism selected from the group of a plurality of structured elements on a surface of the light guide, an optically rough surface, and an extraction strip.

9. A device according to claim 1, further comprising a shade movable between a closed position wherein the shade is located over substantially all of the light emitting region and an open position wherein the shade is removed from substantially all of the light emitting region.

10. A device according to claim 9, wherein the light guide comprises a distal end, and further wherein the distal end of the light guide emits light traveling through the light guide from the light source.

11. A device according to claim 1, wherein the light guide comprises a distal end, and further wherein the distal end of the light guide reflects substantially all of the light transmitted to the distal end from the light source.

12. A worklight comprising:
 a light source;
 a light guide extending along a longitudinal axis, the light guide comprising:
  a solid core;
  an input end adapted for connection to the light source; and
  a light emitting region directing light traveling though the light guide
  from the light source out of at least a portion of at least one surface of
  the light guide in a direction generally transverse to the longitudinal
  axis;
 wherein the light source and the light guide are rotatably connected such that the light emitting region of the light guide can be rotated relative to the light source about the longitudinal axis.

13. An illumination kit for an illumination device comprising:
 a first light guide comprising
  a solid core extending along a longitudinal axis;
  an input end adapted for connection to a light source;
  a light emitting region directing light traveling through the light guide from the light source out of at least a portion of at least one surface of the light guide in a direction generally transverse to the longitudinal axis, the emitted light having a first lateral angular distribution;
 a second light guide comprising
  a solid core extending along a longitudinal axis;
  an input end adapted for connection to a light source;
  a light emitting region directing light traveling through the light guide from the light source out of at least a portion of at least one surface of the light guide in a direction generally transverse to the longitudinal axis, the emitted light having a second lateral angular distribution.

14. A light guide system comprising:
 a solid core extending along a longitudinal axis, the core comprising:
  an input end adapted for connection to a light source;
  and a light emitting region directing light traveling through the core out of at least a portion of at least one surface of the core in a direction generally transverse to the longitudinal axis; and a shade movable between a closed position wherein the shade is located over substantially all of the light emitting region and an open position wherein the shade is removed from substantially all of the light emitting region.

15. A system according to claim 14, wherein the shade comprises at least one sleeve collapsible along the length of the core.

16. A system according to claim 15, wherein the sleeve is fixedly attached to at least a portion of the core.

17. A system according to claim 15, wherein the sleeve comprises a window that is substantially optically transparent to light emitted from the light emitting region.

18. A system according to claim 17, wherein the window comprises a void in the sleeve.

19. A system according to claim 17, wherein the window and the light emitting region emit light with a lateral angular distribution of less than 360 degrees.

20. A system according to claim 17, wherein the window and the light emitting region emit light with a lateral angular distribution of about 180 degrees or less.

21. A system according to claim 14, wherein the shade comprises a plurality of sleeves, each of the sleeves being collapsible along the length of the core.

22. A system according to claim 21, wherein a first sleeve in the plurality of sleeves is substantially opaque over substantially all of its surface to light emitted from the light emitting region of the core, and further wherein a second sleeve in the plurality of sleeves comprises a window that is substantially optically transparent to light emitted from the light emitting region of the core.

23. A system according to claim 22, wherein the light emitting region extends over substantially the length of the core.

24. A system according to claim 14, wherein the core comprises a distal end, and further wherein the distal end of the core emits light traveling through the core from a light source.

25. A kit according to claim 13, further comprising a light source adapted for connection to the input ends of the first and second light guides.

26. A system according to claim 14, wherein the light emitting region of the core emits light with a lateral angular distribution of 360 degrees.

27. A system according to claim 14, wherein the light emitting region of the core emits light with a lateral angular distribution of less than 360 degrees.

28. A system according to claim 14, wherein the light emitting region comprises an extraction mechanism selected from the group of a plurality of structured elements on a surface of the core, an optically rough surface, and an extraction strip.

29. A kit according to claim 13, wherein the first lateral angular distribution is about 360 degrees.

30. A kit according to claim 29, wherein the second lateral angular distribution is less than the first lateral angular distribution.

31. A kit according to claim 13, wherein a cross-sectional profile of the first light guide is different than a cross-sectional profile of the second light guide.

32. A kit according to claim 13, wherein the light emitting region of the first light guide has a length along the longitudinal axis that is different than a length of the light emitting region of the second light guide along its longitudinal axis.

33. A kit according to claim 13, wherein the light emitting regions of each of the first and second light guides comprises an extraction mechanism selected from the group of a plurality of structured elements on a surface of the light guide, an optically rough surface, and an extraction strip.

34. A kit according to claim 13, further comprising at least one shade movable between a closed position wherein the shade is located over substantially all of the light emitting region of one of the first and second light guides and an open position wherein the shade is removed from substantially all of the light emitting region of the light guide.

* * * * *

UNITED STATES PATENT AND TRADEMARK OFFICE
CERTIFICATE OF CORRECTION

PATENT NO. : 6,267,492 B1 Page 1 of 1
DATED : July 31, 2001
INVENTOR(S) : Reid, Thomas J.

It is certified that error appears in the above-identified patent and that said Letters Patent is hereby corrected as shown below:

Title page,
Item [56], References Cited, U.S. PATENT DOCUMENTS, insert -- 4,802,460 2/1989 Ohkuwa et al. and insert -- 4,908,717 3/1990 Natori --;
FOREIGN PATENT DOCUMENTS, insert -- DE 37 18 609 A 12/1987 ; EP 0 874 191 A2 10/1998; and WO 98/22749 5/1998 --;
OTHER PUBLICATIONS, insert -- Poppendieck, M. et al., "Control of Light Output From Plastic Optical Fiber with Optical Elements", 3M Product Brochure No. 960491 pp. 1-5 (undated); --
-- Vrieze, C. et al., "Matching The Model: Plastic Light Fiber Extraction Targeted at SAE Specifications", SAE Technical Paper Series, (No. 980876) SAE International– The Engineering Society For Advancing Mobility Land, Sea, Air and Space, International Congress and Exposition, Detroit, Michigan, February 22-26, 1998, pp. 1-4. --

Figure 7:
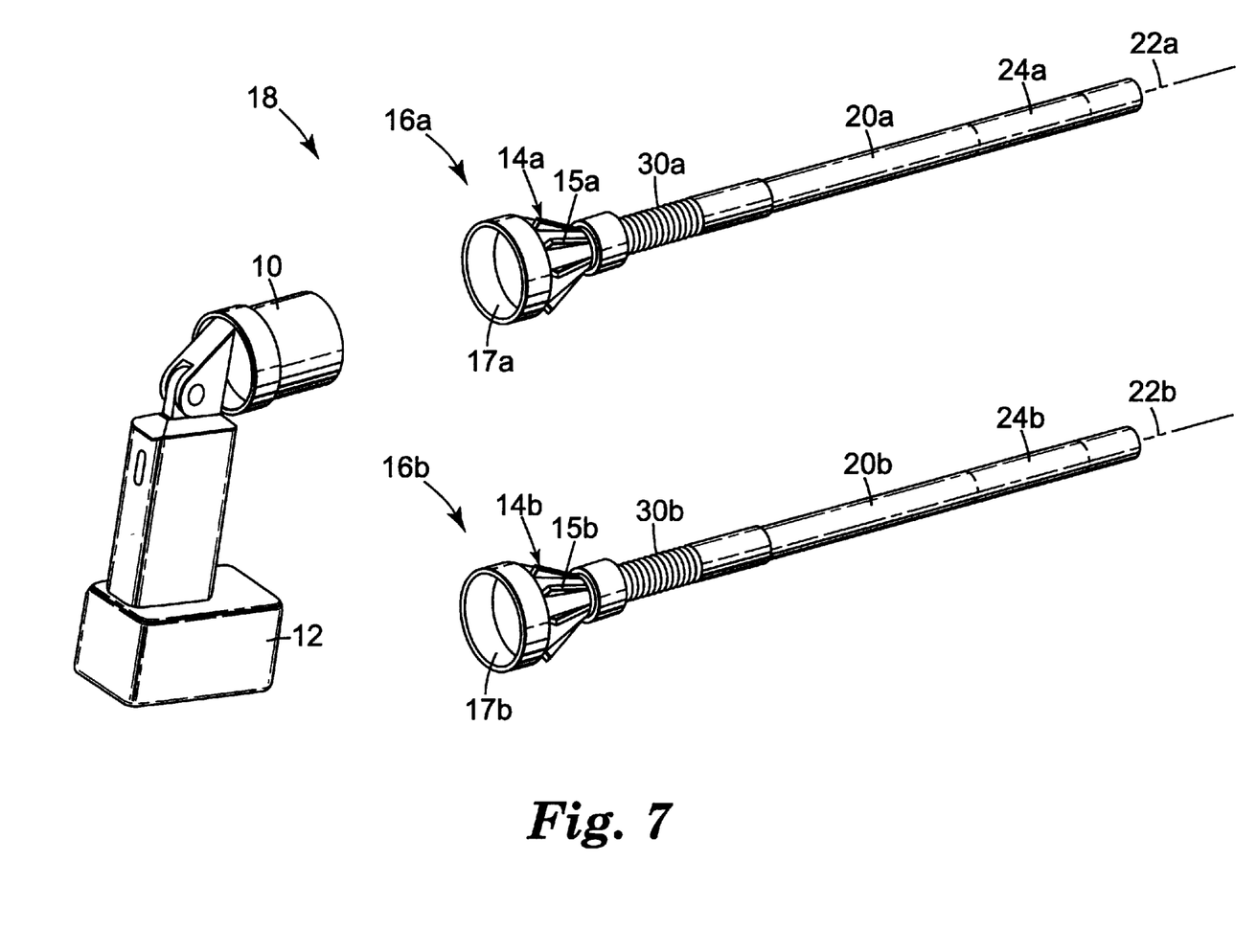
FIG. 7 illumination kit according to the present invention.

Column 4,
Line 25, after "Fig. 7", insert -- illustrates an --;

Column 5,
Line 54, delete "a", insert in place thereof -- α --;

Column 10,
Line 28, 47, and 32, delete "though", insert in place thereof -- through --

Signed and Sealed this

Twenty-fifth Day of May, 2004

JON W. DUDAS
*Acting Director of the United States Patent and Trademark Office*